(12) United States Patent
Tanaka

(10) Patent No.: US 6,466,747 B2
(45) Date of Patent: Oct. 15, 2002

(54) STRUCTURE OF MANUAL OPERATION BUTTON

(75) Inventor: Yasuhiko Tanaka, Saitama (JP)

(73) Assignee: Fuji Photo Optical Co., Ltd., Saitama (JP)

( * ) Notice: Subject to any disclaimer, the term of this patent is extended or adjusted under 35 U.S.C. 154(b) by 0 days.

(21) Appl. No.: 09/962,315

(22) Filed: Sep. 26, 2001

(65) Prior Publication Data
US 2002/0039493 A1 Apr. 4, 2002

(30) Foreign Application Priority Data
Sep. 29, 2000 (JP) ........................................ 2000-299239

(51) Int. Cl.[7] .............................................. G03B 17/00
(52) U.S. Cl. ........................ 396/543; 200/294; 200/329
(58) Field of Search ................................. 396/543, 263; 200/294, 329, 333, 338, 345

(56) References Cited

U.S. PATENT DOCUMENTS 4,293,210 A * 10/1981 Kando et al. ................ 396/263
4,480,163 A * 10/1984 Morris et al. ................ 200/331

FOREIGN PATENT DOCUMENTS

JP 7-43810 2/1995
JP 9-185110 7/1997

* cited by examiner

Primary Examiner—David M. Gray
(74) Attorney, Agent, or Firm—Arnold International; Bruce Y. Arnold

(57) ABSTRACT

A decorative frame that may be made of metal is arranged at the periphery of a manual operation button, and the manual operation button with decorative frame are designed so that they may be fixedly attached to the exterior cover of a camera body within an opening in the cover. More specifically a structure of a manual operation button is disclosed that includes: a decorative frame having an exterior portion that will not fit within the opening and an interior portion that will fit within the opening; a manual operation button positioned within an inner periphery of the decorative frame; and a holding member that is installed within the camera body, with a portion of the holding member abutting the inside surface of the camera body exterior cover and a portion of the decorative frame abutting the outside surface of the camera body exterior cover so that the decorative frame and holding member, when assembled as a unit, envelope the rim portion of the opening so as to attach the decorative frame and the holding member to the cover. The holding member holds the manual operation button so that it may be depressed to various positions when operating the camera.

6 Claims, 6 Drawing Sheets

STRUCTURE OF MANUAL OPERATION BUTTON

BACKGROUND OF THE INVENTION

Various manual operation buttons, such as a release button, are used in a camera. A holding member is provided inside the camera body, and the manual operation button is assembled into the holding member such that the button can be operated from one state to another by pressing on it. An opening is formed in a camera body exterior cover, hereinafter shortened to cover. The cover may be formed in one or more pieces, and the manual operation button is exposed to the outside through the opening.

Generally, when the cover is made of plastic, the holding member is integrally formed with the cover, as in Japanese Laid-Open Patent Application H9-185110. FIG. 4 shows one prior art example where the holding member is integrally molded with a plastic cover 50. An opening 51 is provided in the cover 50, and a holding member 52 is integrally formed with the cover 50 in a portion of the opening 51. A shaft 53b is formed on the lower surface of a disc 53a, an aperture 52a is established on the inner surface of the holding member 52, and a shaft 53b is inserted into the aperture 52a. A nail clasp 54 is integrally molded along the rim of the disc 53a, an aperture 55 is established between the bottom surface of the cover 50 and an outer surface of the holding member 52, and the nail clasp 54 is inserted into the aperture 55. This results in the assembly of a release button 53 as a manual operation button within the holding member 52, with the release button 53 being movable up and down with an appropriate stroke.

A spring 56 is arranged between the disc 53a and the holding member 52. The release button 53 is assembled as mentioned above and is biased upward by the spring 56. The release button 53 is set so as to not separate or be dislodged due to a rim 54a of the nail clasp 54 engaging with the underside of the cover 50 at the perimeter of the opening 51. By pushing the release button 53 downward against the bias force of the spring 56, a release switch 57 on the under side of the shaft 53b is operated.

Alternatively, in the case of utilizing a cover that is made of metal, it is difficult to mold an integral holding member having such a complicated shape. Therefore, when utilizing a cover that is made of metal, a holding member that is made of plastic is mounted on the cover as a separate component, and the release button is assembled into this plastic holding member. Further, in Japanese Laid Open Patent Application H7-43810, it is proposed that a molded cover be formed having almost the same shape as a metal cover, and this molded cover is installed on the inside of the metal cover by using a double-faced tape or an adhesive bonding. This allows the holding member for the manual operation button to be integrally formed with this molded cover. Further, in order to prevent the release button from being unintentionally activated, and in order to cover a rim portion of the opening, a camera can have a decorative frame arranged around the periphery of the manual operation button.

FIG. 5 shows another prior art example where a ring-shaped member 63 is integrally molded with a holding member that is made of plastic, and this holding member is mounted to the cover. A disc-shaped bottom surface 61 has an aperture 52a that guides a release button 53. A cylinder-shaped sleeve 62 is formed along the rim of this bottom surface 61, and the ring-shaped member 63 is established on the upper end of the sleeve 62. The holding member 60 is formed of the disc-shaped bottom surface 61, the sleeve 62 and the ring-shaped member 63. The sleeve 62 is fitted into the opening 51 in the cover 50. The ring-shaped member 63 is arranged on the surface of the cover 50. A nail clasp 62a is mounted at the outer surface of the sleeve 62 so that it abuts against the internal surface of the cover 50 when the holding member 60 is mounted to the cover 50. The holding member 60 is supported by the cover 50 and is held in place by the ring-shaped member 63 above and the nail clasp 62a below. This results in an assembly of the holding member 60 so as to not separate or be dislodged from the cover 50. The other components in FIG. 5 function practically the same as similarly numbered components in FIG. 4, and thus they will not be separately discussed.

In order to make a camera's appearance look expensive and elegant, it is preferable that, in addition to the cover being made of metal, the ring-shaped member also be made of metal. It is more preferable to use a material that has been processed by a cutting operation using a lathe, so as to form a component that is termed a 'turned' component, in order to make a camera's appearance look expensive and elegant. However, when using a cutting process it is difficult to create an object with a complicated shape such as, for example, the object shown in FIG. 5 wherein a ring-shaped member and a holding member are formed as an integral unit.

Further, in Japanese Laid Open Patent Application H7-43810, a holding member holds a manual operation button, and the holding member is integrally formed with a molded cover, which is adhered to the internal surface of a metal cover. An installation member, for the purpose of installing a ring-shaped member to the molded cover, is integrally formed with the molded cover. Then, a metal ring-shaped member is secured to this molded cover. The molded cover is adhered to the internal surface of the metal cover by using a double-faced tape or an adhesive bonding material. It is unavoidable that a gap between the molded cover and the metal cover can change due to the application thickness of the adhesive bonding material. Thus, the positioning accuracy for the holding member and the installation member may become less than the positioning accuracy established for the opening in the cover. Therefore, problems may occur such as the ring-shaped member becoming dislodged from the surface of the cover, or the ring-shaped member not being able to be properly installed.

BRIEF SUMMARY OF THE INVENTION

The present invention relates to the structure of a manual operation button, such as a release button. The object of the invention is to provide a structure of a manual operation button wherein a decorative frame that, preferably, is made of metal can be appropriately installed within an opening in a metal cover so as to surround the manual operation button. The decorative frame has an exterior portion that will not fit within the opening and an interior portion that will fit within the opening.

In order to accomplish this, a holding member holds the manual operation button so that it can be moved along an axis, and the manual operation button is mounted within a decorative frame. According to the present invention the decorative frame and the holding member are assembled as a unit which is held in place by the cover.

A first sleeve is arranged within an opening of the cover and is integrally formed with the decorative frame. A second sleeve is fitted into the first sleeve, with the second sleeve being integrally formed with a holding member. An L-shaped flange is formed on the external peripheral surface of the second sleeve and the top surface of the flange abuts against the inside surface of the cover. The inner peripheral surface of the first sleeve faces the outer peripheral surface of the second sleeve. Engagement means, such as protrusions/indentations, etc., are formed on the peripheral surface of the first sleeve at spaced positions which engage with indentations/protrusions at corresponding spaced positions on the outer peripheral surface of the second sleeve so that the two sleeves can be fixedly attached to one another. The engagement means can be any known mechanism for attaching the two together. This results in the assembly of the decorative frame and the holding member as a unit, with a portion of the decorative frame abutting the outer surface of the cover at the rim of the opening and a portion of the holding member (i.e., the top surface of the L-shaped flange), abutting the inner surface of the cover at the rim of the opening. In this way, the decorative frame and holding member are fixedly attached to the cover. For ease of manufacture, it is preferred that the decorative frame be ring-shaped and that the manual operation button be round; however, this is not required.

BRIEF DESCRIPTION OF THE DRAWINGS

The present invention will become more fully understood from the detailed description given below and the accompanying drawings, which are given by way of illustration only and thus are not limitative of the present invention, wherein.

DETAILED DESCRIPTION

Figure 2:
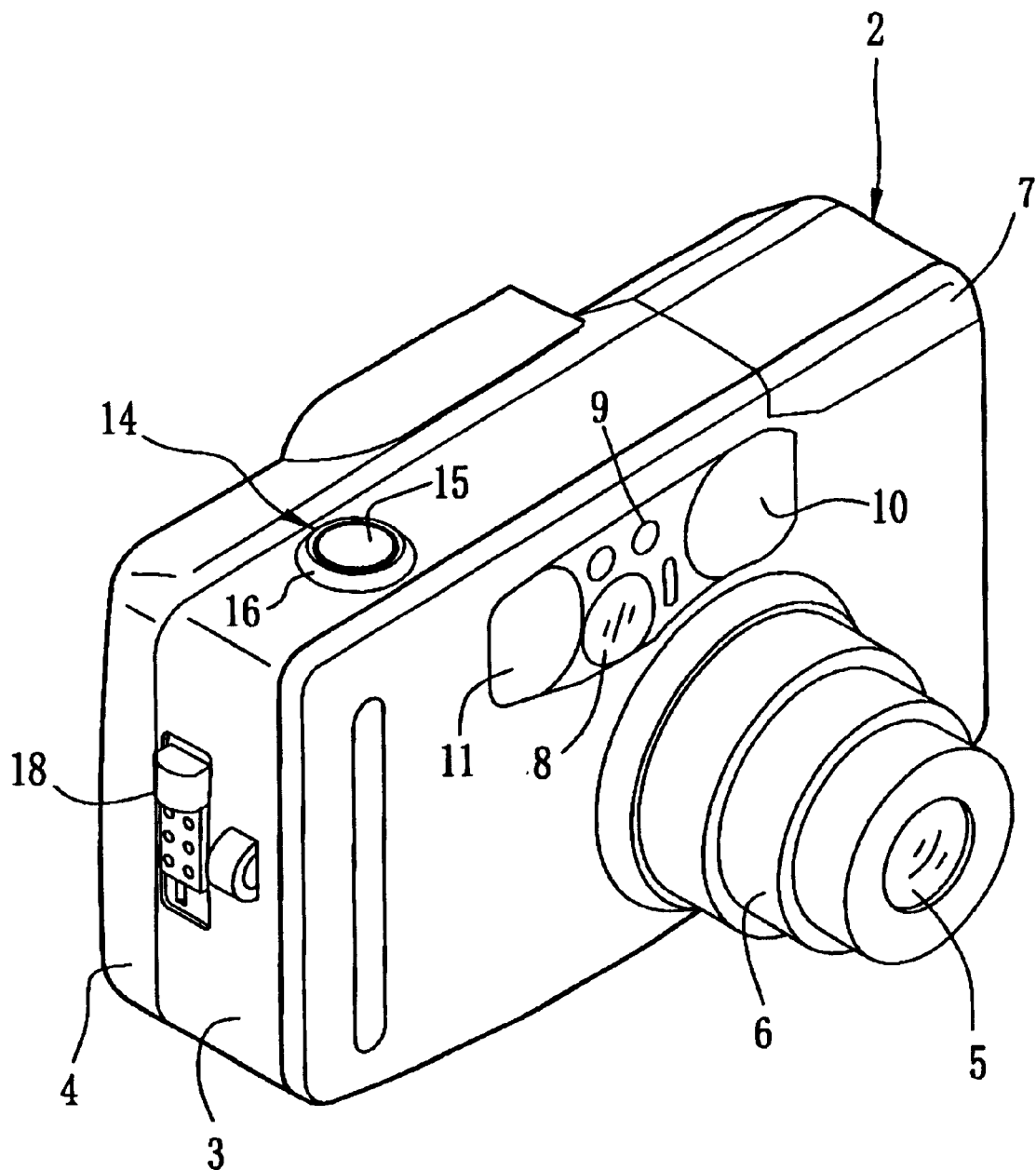
FIG. 2 shows a camera's appearance wherein a manual operation button structure according to the present invention has been implemented.

FIG. 2 shows a camera's appearance wherein a manual operation button structure according to the present invention has been implemented. A camera body 2 is constructed with a body frame (not shown in the drawing), where various flexible boards containing electronic components are mounted, and where photographic mechanism components are assembled. The camera body 2 includes a front cover 3 and a rear cover 4. The front cover 3 and the rear cover 4 are made of metal, such as aluminum, in order to make the camera's appearance look expensive and elegant.

A lens body tube 6 is arranged in the center of the front face of the camera body 2 and holds a photographic lens 5. A strobe emission device 7 is provided that is of the pop-up type, and this strobe emission device 7 is installed in the left upper section of the camera, as illustrated. An object-side finder window 8, a photometric window 9, a ranging floodlight window 10 and a ranging sensor window 11 are all installed in the center upper section of the camera, as illustrated. The photographic lens 5 is a zoom optical system. It and an electronic shutter are assembled inside the lens body tube 6. A power switch is provided on the rear surface of the camera. When this switch is turned on, the lens body tube 6 is projected forward from the camera body 2, as illustrated. When the power switch is turned off, the lens body tube 6 is retracted inside the camera. Further, a zoom button is located on the rear side of the camera body in order to vary the focal length of the camera. The strobe emission device 7 is a zoom strobe. This device operates in conjunction with the lens body tube 6 according to the operation of the zoom button, and thus the illuminated region changes depending on the distance from the camera to the object being photographed.

A release button 15 and a decorative frame, such as decorative ring 16, are provided in a section of the front cover 3 located at the upper right side of the camera body 2. Thus, the manual operation button 14 includes, as subcomponents thereof: the release button 15, as well as the decorative frame (i.e., decorative ring 16). An opening 17 (FIG. 1) is established in the front cover 3 for the purpose of exposing the release button 15 to the outside. The decorative ring 16 covers the rim of the opening 17. It also functions to surround the release button with a surface that protrudes from the camera at least as far as does the top surface of the release button, to thereby greatly reduce occurrences of accidental activation of the release button 15. The decorative ring 16 is made of metal, such as stainless steel, in order to make the camera's appearance look expensive and elegant.

The release button 15 includes various positions in which the release button is operative under various pressing amounts, such as a one-half depressed position and a fully-depressed position. Of course, the one-half depressed position need not be located at one-half the full stroke of the release button, and may instead be other amounts, such as a shallow position. When the release button 15 is activated to the one-half depressed position with the power switch in the ON position, the brightness of the object is measured by a photometric unit, which is arranged in the back of the photometric window 9. Further, an IRED (infrared ray emission diode) is arranged in the back of the ranging floodlight window 10, and the infrared rays from the IRED are directed toward the object. The infrared rays that are reflected from the object are then received at a PSD (position sensor diode), which is located behind the ranging sensor window 11. This results in a measurement of the distance to the object, as is known in the prior art.

When the release button 15 is fully depressed, a photographing operation begins. First, a part of the photographic lens 5 shifts, based upon the distance to the subject as measured previously when the one-half depressed position of the release button was reached. After the camera has been focused, an electronic shutter of the camera is operated by a shutter timing mechanism using a diaphragm stop. Based upon the ambient brightness level of the object being photographed, the film is exposed so as to photograph the object.

An operation member 18 is installed on one side of the camera body so as to be free to slide up and down. This operation member 18 is operated when the bottom lid of the cartridge space is opened to admit the IX 240 type film cartridge. Furthermore, when an unused or partly used film cartridge is loaded in the cartridge space, the operation member 18 is locked, and the bottom lid cannot be opened.

Figure 1:
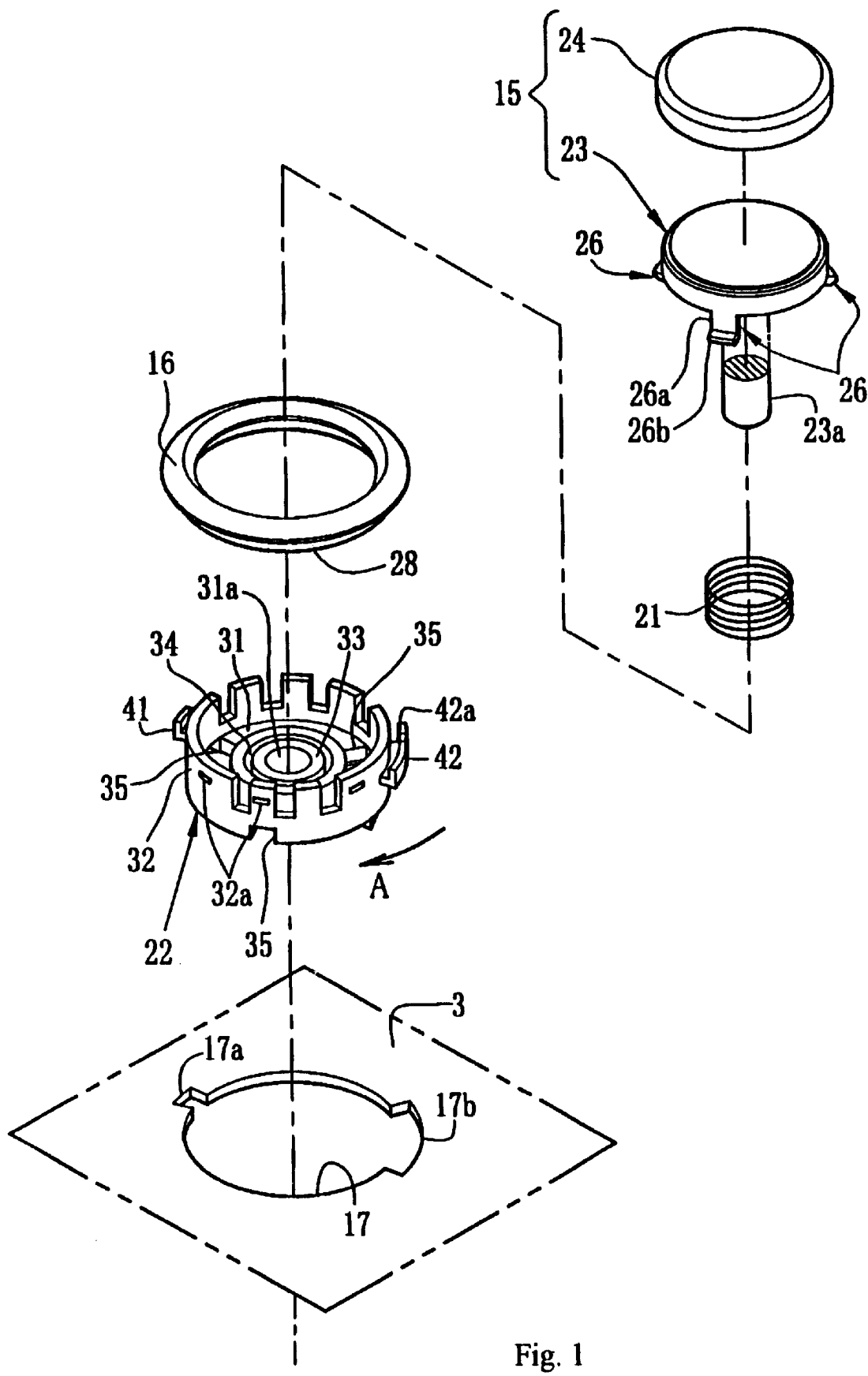
FIG. 1 shows a preferred construction of the manual operation button.
Figure 3A:
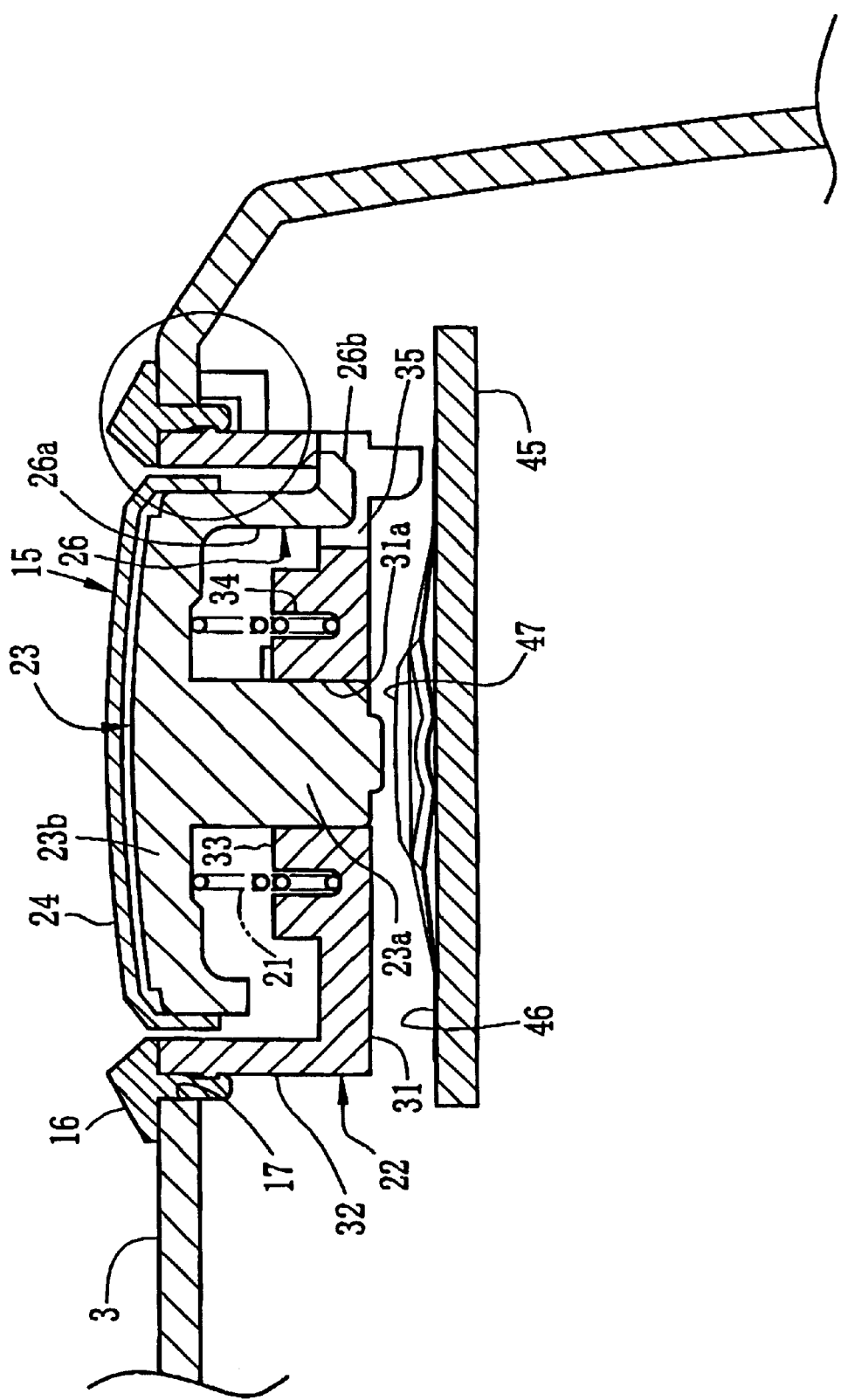
FIG. 3A shows a vertical cross-section of the manual operation button 14 as shown in FIG. 2.

FIG. 1 shows a preferred construction of the manual operation button 14. Further, a vertical cross-section of the manual operation button 14 is shown in FIG. 3A. The manual operation button 14 is assembled into the opening 17 of the front cover 3 using coil spring 21 and a holding member 22.

The release button 15 is formed of a button main body 23 that may be molded of plastic, and a decorative cap 24 that is made of metal. A disc 23b (FIG. 3A) is integrally formed with the button main body 23 at the upper end of a cylinder-shaped shaft 23a. Further, nail clasps 26 extend downward at certain positions along the rim of the disc 23b. For example, these nail clasps 26 may be positioned at spaced intervals (such as every 120°) about the rim of the disc 23b. These nail clasps 26 are each formed of a leg 26a and a nail ledge 26b with the nail ledge 26b projecting radially outward from the end of each leg 26a.

A decorative cap 24 is firmly affixed onto the upper surface of the disc 23b, and this decorative cap 24 is exposed at the upper surface of the camera body 2 as the pressing surface for the release button 15. The cross-section of the decorative ring 16 portion that extends above the surface of the cover has a shape similar to that of an inverted V, and the internal diameter of the decorative ring 16 is slightly larger than the external diameter of the decorative cap 24. In addition, this decorative ring 16 is formed with a ring shape whose external diameter is larger than the diameter of the opening 17.

Figure 3B:
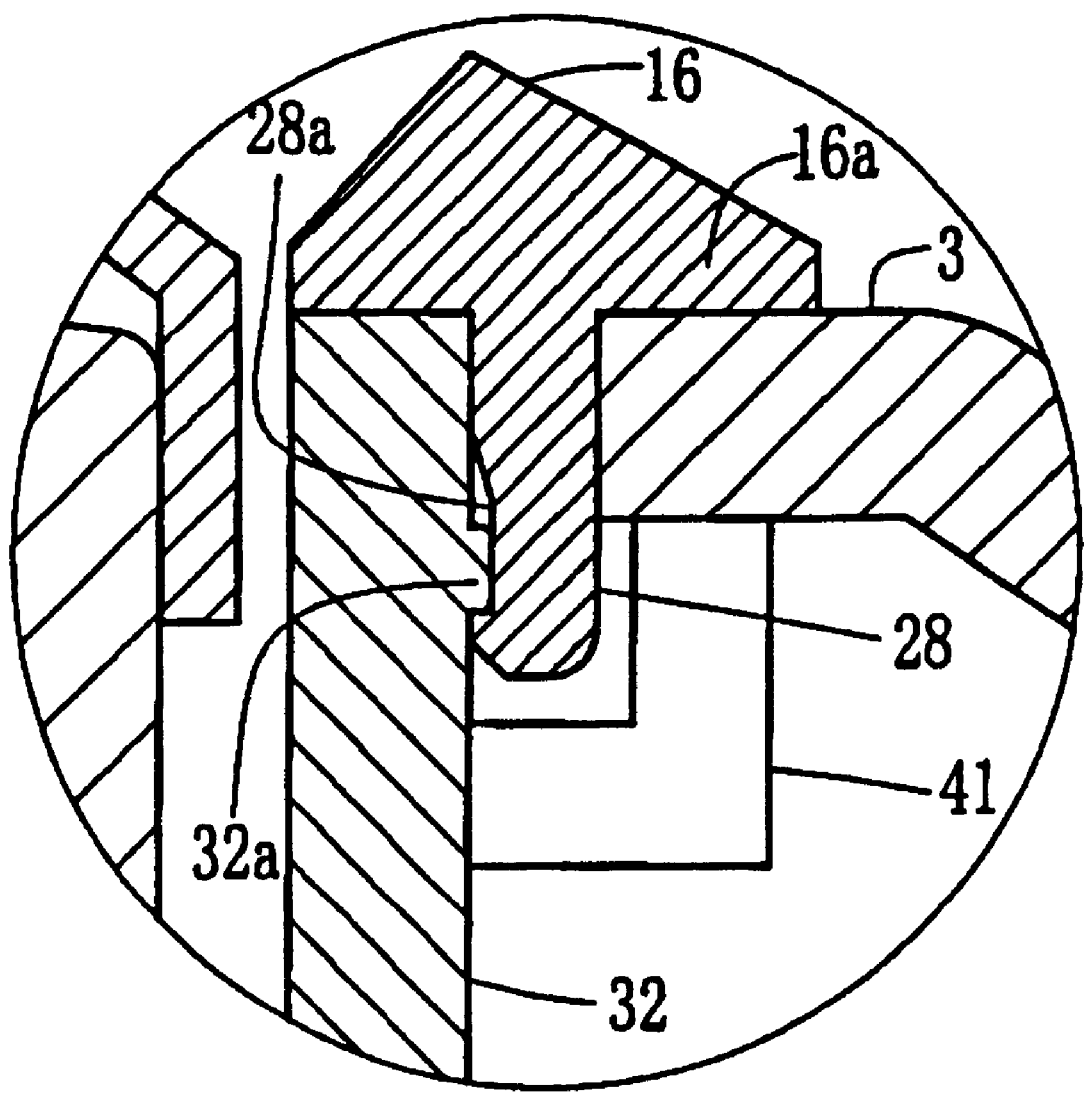
FIG. 3B shows an expanded view of the circled region illustrated in FIG. 3A.
Figure 4:
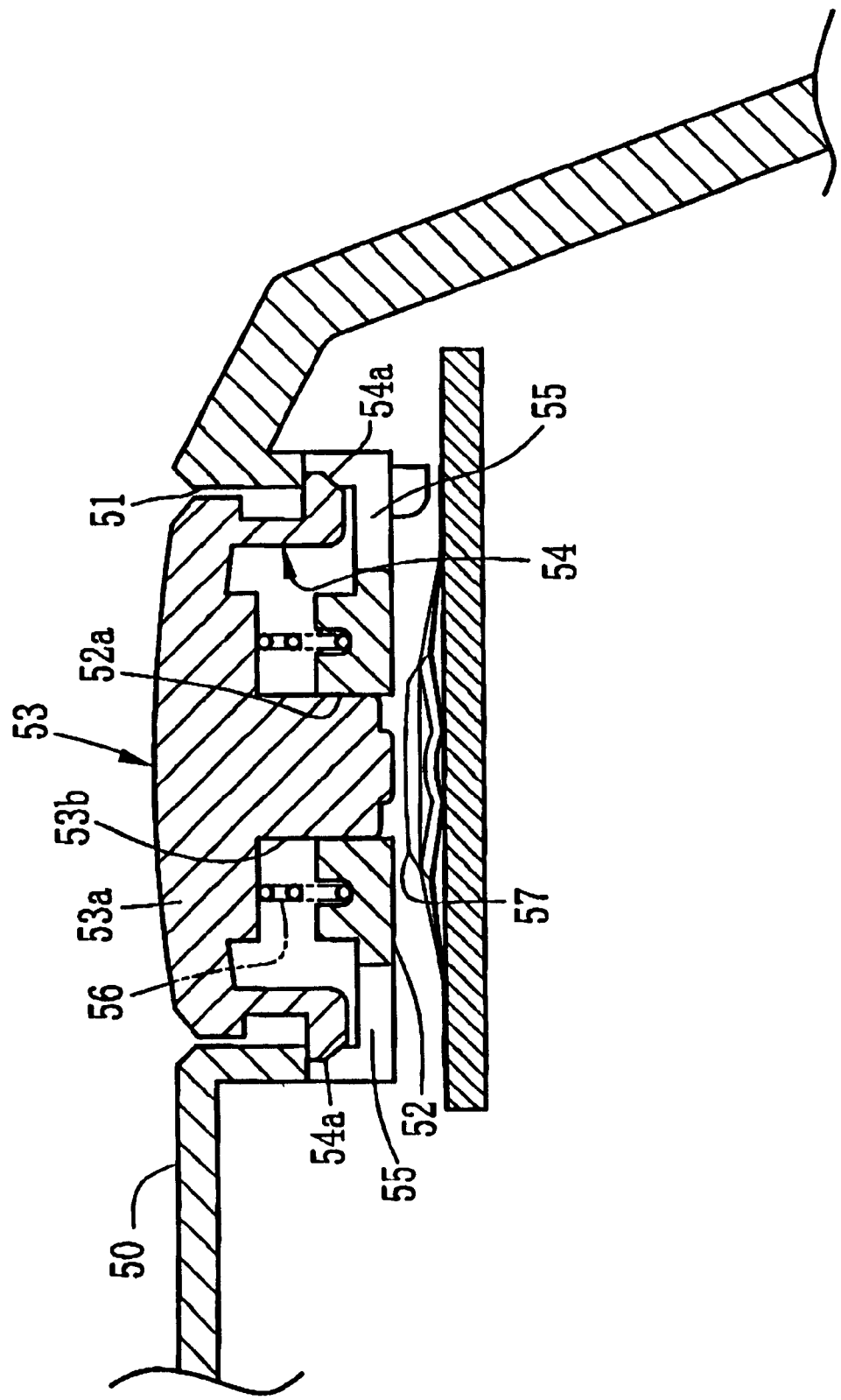
FIG. 4 shows one prior art example where the holding member is integrally molded with a plastic cover 50.
Figure 5:
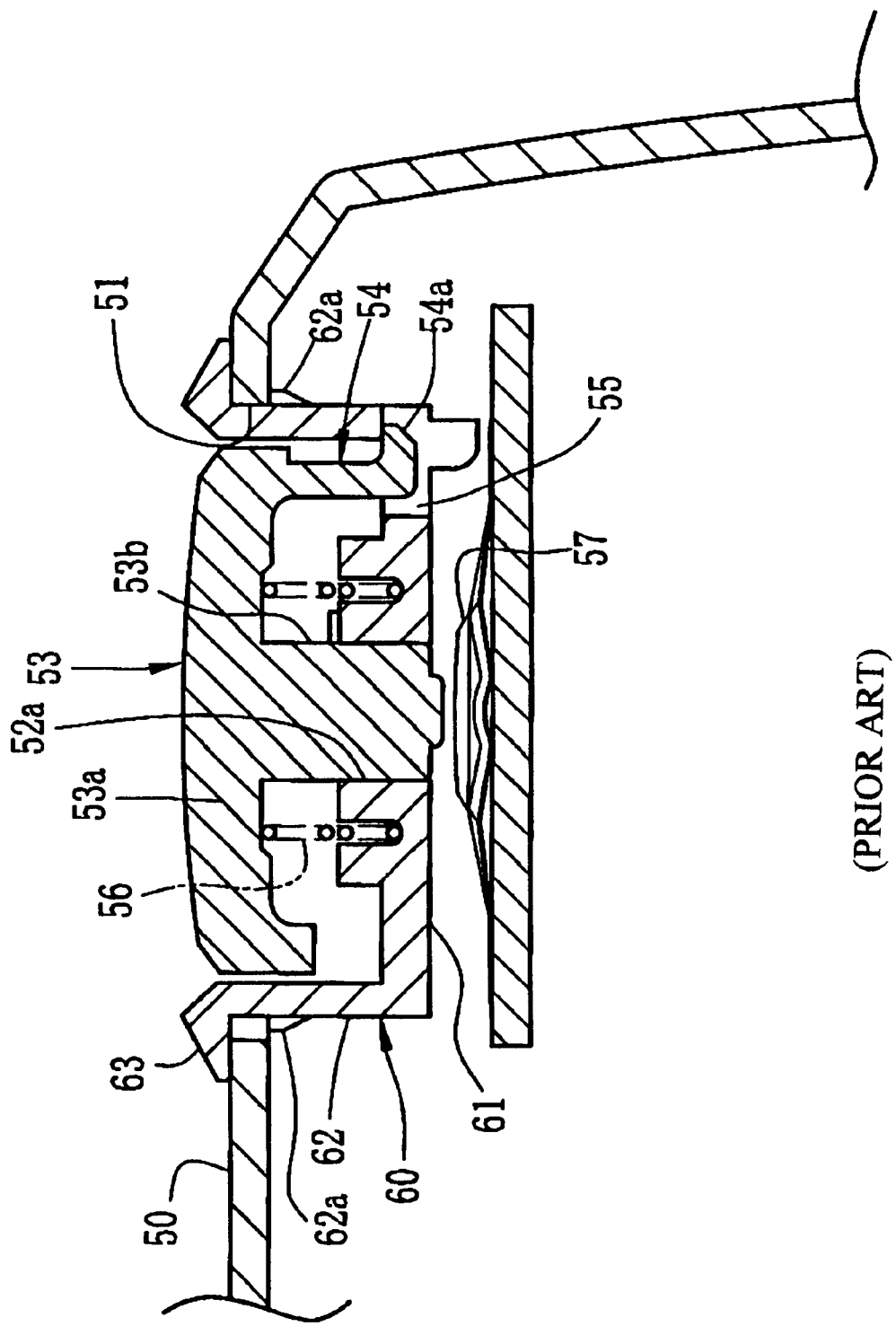
FIG. 5 shows another prior art example where a ring-shaped member 63 is integrally molded with a holding member that is made of plastic, and this holding member is mounted to the cover.

As shown in FIG. 3B, which illustrates an expanded view of the circled region illustrated in FIG. 3A, a lower portion of the decorative ring 16 includes a decorative ring side sleeve 28 that has a cylindrical shape and is established as a first sleeve fitted into the opening 17 (FIG. 1). The external diameter of the decorative ring side sleeve 28 is almost the same as that of the opening 17, and the external diameter of the decorative ring side sleeve 28 is formed smaller than the external diameter of the decorative ring 16. A recessed region 28a having a slot shape is formed along the periphery of the inner surface of the decorative ring side sleeve 28. The decorative ring 16 and the decorative ring side sleeve 28 are integrally formed and have a common axis. Because the decorative ring 16 and the decorative ring side sleeve 28 have rotationally symmetrical shapes with a common central axis (corresponding to the central axis of the opening 17), these parts can be molded as an integral unit and easily cut on a lathe.

As mentioned above, the external diameter of the decorative ring side sleeve 28 is formed smaller than the external diameter of the decorative ring 16, and this results in the formation of a guard 16a that projects outward from the decorative ring side sleeve 28. The front cover 3 supports the decorative ring 16 due to this guard 16a and a flange. The flange will be described later.

Referring to FIGS. 1 and 3A, the holding member 22 is constructed with a bottom surface 31, and an inside sleeve 32 as the second sleeve within the opening 17. The bottom surface 31 holds the release button 15 in a manner wherein the release button 15 is free to move up and down. The bottom surface 31 has a disc shape and, in the center of the bottom surface 31, an aperture 31a is formed so as to allow a shaft 23a of the button main body 23 to be passed through the aperture 31a. A protrusion 33, having an annular or cylindrical shape is formed around the periphery of the aperture 31a so as to guide the shaft 23a in a straight line when the release button 15 is pressed. Further, an annular groove 34 is formed in the top surface of the protrusion 33 so that a lower portion of a coil spring 21 may be inserted into the groove 34. This results in the assembly of the coil spring 21 into the holding member 22.

An engagement aperture 35 is formed at each radial position of the bottom surface 31 where there is to be a nail clasp 26 of the button main body 23. The shaft 23a of the release button 15 is passed through the open center region of coil spring 21 and the aperture 31a and is inserted so that each nail clasp 26 fits into an engagement aperture 35. This results in the assembly of the release button 15 into the holding member 22 in the status where the release button 15 is biased upward by the coil spring 21.

The leg 26a of each nail clasp 26 is loosely inserted into the engagement aperture 35 so that the shaft 23a is guided by the protrusion 33. As a result, the release button 15 is free to move up and down with a stroke of a few millimeters. Further, a nail ledge 26b of each nail clasp 26 engages with an edge (i.e., the lower end of the inside sleeve 32) of the engagement aperture 35, and this results in the restriction of the upward movement of the release button 15. In other words, this feature opposes the upward bias of the spring and prevents the release button 15 from becoming separated from the camera.

The inside sleeve 32 resembles a cylinder which projects upward along the rim of the bottom surface 31. Multiple minute protrusions 32a are formed at the periphery near the top portion of the cylinder but at a position below the cover 3 at approximately equal intervals of azimuth about the cylinder axis of inside sleeve 32. Notches are formed along the inside periphery of the decorative ring side sleeve 28 at positions that correspond to the protrusions 32a. Therefore, the inside sleeve 32 is elastic-deformable inward as well outward.

Referring to FIG. 3B, the inside sleeve 32 is fitted within the decorative ring side sleeve 28 from the under side of the decorative ring side sleeve 28. According to this action, each protrusion 32a of the inside sleeve 32 engages with the recessed region 28a on the internal peripheral surface of the decorative ring side sleeve 28; thus, the decorative ring 16 and the holding member 22 are assembled as a single unit.

Furthermore, instead of the formation of the recessed regions 28a on the internal peripheral surface of the decorative ring side sleeve 28 and the formation of the protrusions 32a on the external peripheral surface of the inside sleeve 32, the protrusions may be formed on the internal peripheral surface of the decorative ring side sleeve 28 and the recessed regions may be formed on the external peripheral surface of the inside sleeve 32. In either construction, the inside sleeve 32 of the holding member 22 is fitted into the opening 17.

As shown in FIGS. 1 and 3B, on the external peripheral surface of the inside sleeve 32, flanges 41 and 42 are established, in addition to the protrusions 32a. The flanges 41 and 42 abut against the internal surface of the front cover 3. In the case of assembling the holding member 22 and the decorative ring 16, the flange 41 projects outward from the external peripheral surface of the inside sleeve 32. In addition, the flange is L-shaped, as illustrated, so that it extends outward and then upward and abuts against the internal surface of the front cover 3, just under the guard 16a of the decorative ring 16, without interfering with the decorative ring side sleeve 28.

The flange 42 (FIG. 1) is also L-shaped. However, the length of flange 42 around the periphery of the inside sleeve 32 is longer than that of the flange 41. Further, a stop projection 42a is formed at the end of the flange 42 having a projection that extends higher than the other portions of flange 42.

In the situation where the decorative ring 16 and the holding member 22 are assembled, the gap between the end of each flange 41 and 42 and the guard 16a of the decorative ring 16 is designed to be almost the same thickness as the front cover 3.

The opening 17 is substantially identical in diameter to the external diameter of the decorative ring side sleeve 28. Notches 17a and 17b are formed on the rim of opening 17, and these notches correspond in position to the flanges 41 and 42, respectively.

In the case where the manual operation button 14 is mounted on the front cover 3 and the manual operation button is constructed as mentioned above, the inside sleeve 32 of the holding member 22 is fitted into the inside of the decorative ring side sleeve 28. The release button 15 and the coil spring 21 are assembled to the holding member 22 in advance and the protrusion 32a at the side of the inside sleeve 32 is engaged with the recessed region 28a at the side of the decorative ring side sleeve 28. Thus, the decorative ring 16 and the holding member 22 are assembled as a unit.

Next, the flanges 41 and 42 are situated according to the positions of the corresponding notches 17a and 17b, respectively, and the decorative ring side sleeve 28 is fitted into the opening 17 from the top side of the front cover 3. Then, the holding member 22 is rotated within the opening 17 in the direction indicated by the arrow A in FIG. 1, up to the position where the stop projection 42a of the flange 42 abuts against the edge of the notch 17b. The rotation of the holding member 22 up to the position where the stop projection 42a abuts against the edge of the notch 17b results in positioning this holding member 22 to the predetermined rotation position with respect to the opening 17.

Further, as the holding member 22 is rotated within the opening 17 as mentioned above, the ends of the flanges 41 and 42 shift away from the position facing the notches 17a and 17b, respectively. In this manner, the front cover is gripped between the guard 16a of the decorative ring 16 and the flange 41, as shown in FIG. 3B. Although not illustrated in FIG. 3B, the front cover is also gripped between the guard 16a of the decorative ring 16 and the flange 42. Furthermore, the notches 17a and 17b are covered over by the decorative ring 16, so that these notches are not exposed to the outside.

After mounting as mentioned above, the decorative ring side sleeve 28 (FIG. 3B) and the holding member 22 (FIG. 1) are secured with an adhesive bonding agent at the internal surface side of the front cover 3. Furthermore, the decorative ring side sleeve 28 and the holding member 22 are affixed by the engagement means and/or an adhesive bonding agent to prevent rotation within the opening 17. Thus, the decorative ring 16 and the holding member 22 are prevented from separating or being dislodged from the front cover 3.

Referring to FIG. 3A, a support plate 45 is secured to the camera body frame, and is positioned immediately beneath the holding member 22. A flexible board 46 is arranged on this support plate 45, and a release switch 47 is established on this flexible board 46. This release switch 47 is pressured by the shaft 23a of the depressed release button 15, and it is turned on. A two-stage type switch is used for the release switch 47, for the purpose of detecting a pressure operation to the one-half depressed position or the fully depressed position of the release button 15. A one-half depression signal or a full depression signal is transmitted, depending upon the pressure operation, to the microcomputer which controls each section of the camera, and these are used as the trigger signal for the purpose of the various processes of the photography.

The support plate 45 via the release switch 47 restricts the downward slide of the release button 15. Therefore, the pressure upon the release button 15 does not directly affect the holding member 22, and the engagement between the decorative ring side sleeve 28 and the inside sleeve 32 does not separate.

Referring to FIG. 1, the decorative ring 16 and the holding member 22 are made so as to be assembled as an integral unit. This unit shown is intended to be assembled from the surface side of the front cover 3. However, it is also possible that the holding member 22 may be mounted from the internal surface side of the front cover 3, in which case the notches 17a and 17b along the rim of the opening 17, which correspond to the flanges 41 and 42, are unnecessary and may be omitted. So long as the stop projection 42a and a notch in the front cover 3 that corresponds to the stop projection engage with each other, the rotation position of the holding member 22 with respect to the opening 17 can be specified and, the rotation of the holding member 22 can be restrained without using the prior-mentioned adhesive.

As explained in detail above, according to the present invention, a holding member is arranged inside a cover, and holds a manual operation button so that it may be moved along an axis within an opening of the cover. The holding member and a decorative frame are assembled as a unit, which is attached to the cover. The cover supports the decorative frame and the holding member by the decorative frame abutting an outer surface of the cover at the rim of an opening and the holding member abutting the inner surface of the cover at the rim of an opening.

Further, the decorative frame is arranged around the periphery of the manual operation button, a first sleeve is integrally formed with the decorative frame, and the first sleeve is arranged within an opening in the cover. This first sleeve is fitted around a second sleeve that is attached to the holding member, and engagement means are provided on the first and second sleeves so that the sleeves can be attached to one another as a unit. The holding member holds the manual operation button, and both are then assembled within the decorative frame. A flange is established on the external peripheral surface of the second sleeve, and the decorative frame is arranged on the surface of the cover. Preferably, both the decorative frame and the manual operation button are rotationally symmetric. This allows each component to be of a simple design, that can easily be manufactured in metal, and enables the components to be efficiently assembled.

The invention being thus described, it will be obvious that the same may be varied in many ways. For example, the present invention is not limited to the disclosed embodiment, as the invention can be advantageous when used for various manual operation buttons, such as a zoom button. Further, the invention can also be utilized for various cameras other than a camera using photographic film, such as a digital camera or a video camera. Further, in the disclosed embodiment, the installation of the decorative frame and the holding member is performed by engagement between a recessed portion and a protrusion that are established on each sleeve. However, other various installation techniques can be adopted. For example, screw threads could be formed on one or more of the sleeves and the two pieces secured by screwing them together. In addition, the decorative frame need not be ring-shaped, as other shapes for the decorative frame and manual operation button can be utilized, such as a polygon. Further, these need not be made of metal, but may be made from one or more other substances having an attractive appearance, such as plastic with a metallic coating. Such variations are not to be regarded as a departure from the spirit and scope of the invention. Rather, the scope of the invention shall be defined as set forth in the following claims and their legal equivalents. All such modifications as would be obvious to one skilled in the art are intended to be included within the scope of the following claims.

What is claimed is:

1. A structure of a manual operation button of a camera, comprising:

an opening, defined by a rim portion, in a camera body exterior cover;

a decorative frame having an exterior portion that will not fit within the opening and an interior portion that will fit within the opening;

a manual operation button positioned within an inner periphery of the decorative frame;

a holding member, installed within the camera body, with a portion of the holding member abutting the inside surface of the camera body exterior cover, and a portion of the decorative frame abutting the outside surface of the camera body exterior cover so that the decorative frame and holding member, together, envelope the rim portion of the opening so as to attach the decorative frame and the holding member to the cover, said holding member guiding the manual operation button so that it is movable along an axis.

2. The structure of a manual operation button of a camera as set forth in claim 1, wherein the decorative frame is made of metal.

3. The structure of a manual operation button of a camera as set forth in claim 1, wherein the decorative frame is ring-shaped.

4. The structure of a manual operation button of a camera as set forth in claim 1, wherein the decorative frame extends above the surface of the camera body exterior cover at least as far as the movable range of the manual operation button along said axis, to thereby reduce the occurrence of unintentionally depressing the manual operation button.

5. A structure of a manual operation button of a camera, comprising:

an opening, defined by a rim portion, said opening formed in a camera body exterior cover;

a ring-shaped decorative frame that is made of metal having an exterior portion that will not fit within the opening and an interior portion that will fit within the opening;

a manual operation button positioned within an inner periphery of the decorative frame;

a holding member, installed within the camera body, with a portion of the holding member abutting the inside surface of the camera body exterior cover, and a portion of the decorative frame abutting the outside surface of the camera body exterior cover so that the decorative frame and holding member, together, envelope the rim portion of the opening so as to attach the decorative frame and the holding member to the camera body exterior cover, said holding member guiding the manual operation button so that it is movable along an axis.

6. A structure of a manual operation button of a camera, comprising:

an opening having a rim portion, said opening formed in a camera body exterior cover;

a decorative frame that is made of metal having an exterior portion that will not fit within the opening and an interior portion that will fit within the opening, said interior portion including;

a manual operation button positioned within an inner periphery of the decorative frame; and a holding member, installed within the camera body, with a portion of the holding member abutting the inside surface of the camera body exterior cover, and a portion of the decorative frame abutting the outside surface of the camera body exterior cover so that the decorative frame and holding member, together, envelope the rim portion of the opening so as to attach the decorative frame and the holding member to the camera body exterior cover, said holding member guiding the manual operation button so that it is movable along an axis;

wherein the interior portion of the decorative frame is a first sleeve that is positioned within said opening;

a second sleeve, which is integral with the holding member, is positioned within the first sleeve;

a flange, which is formed on the outer periphery of the second sleeve, abuts against the inside surface of the cover; and, engagement means are formed on facing portions of the first sleeve and second sleeve, thereby enabling the decorative frame and the holding member to be attached to each other as a unit, which in turn enables said unit to be fixedly attached to the cover within the opening in the cover.

* * * * *